United States Patent [19]
Peille

[11] 3,880,559
[45] Apr. 29, 1975

[54] SYSTEM FOR THE CONTINUOUS MANUFACTURE OF PANELS OF SYNTHETIC MATERIAL

[75] Inventor: Jean-Marie Raymond Peille, Esperaza, France

[73] Assignee: Societe Industrielle de Stratifies, Esperaza (Ande), France

[22] Filed: June 18, 1973

[21] Appl. No.: 371,216

Related U.S. Application Data

[63] Continuation-in-part of Ser. No. 224,055, Feb. 7, 1972, Pat. No. 3,841,811.

[30] Foreign Application Priority Data
June 23, 1972 France .............................. 72.22840

[52] U.S. Cl. ................. 425/115; 264/47; 425/224; 425/817 C
[51] Int. Cl. ............................................. B29d 27/04

[58] Field of Search ........ 425/4 C, 110, 115, 817 C, 425/371, 471, 224, 329; 264/47; 164/278

[56] References Cited
UNITED STATES PATENTS

| | | |
|---|---|---|
| 3,240,846 | 3/1966 | Voelker ....................... 425/817 C |
| 3,537,929 | 11/1970 | Keith et al. ....................... 425/4 C |
| 3,702,274 | 11/1972 | Wooler ....................... 425/4 C UX |

*Primary Examiner*—R. Spencer Annear
*Assistant Examiner*—Mark Rosenbaum
*Attorney, Agent, or Firm*—Seidel, Gonda & Goldhammer

[57] ABSTRACT

The invention relates to improvements to a system for the continuous manufacture of panels from an expandable synthetic material which is applied to a sheet forming a facing.

5 Claims, 4 Drawing Figures

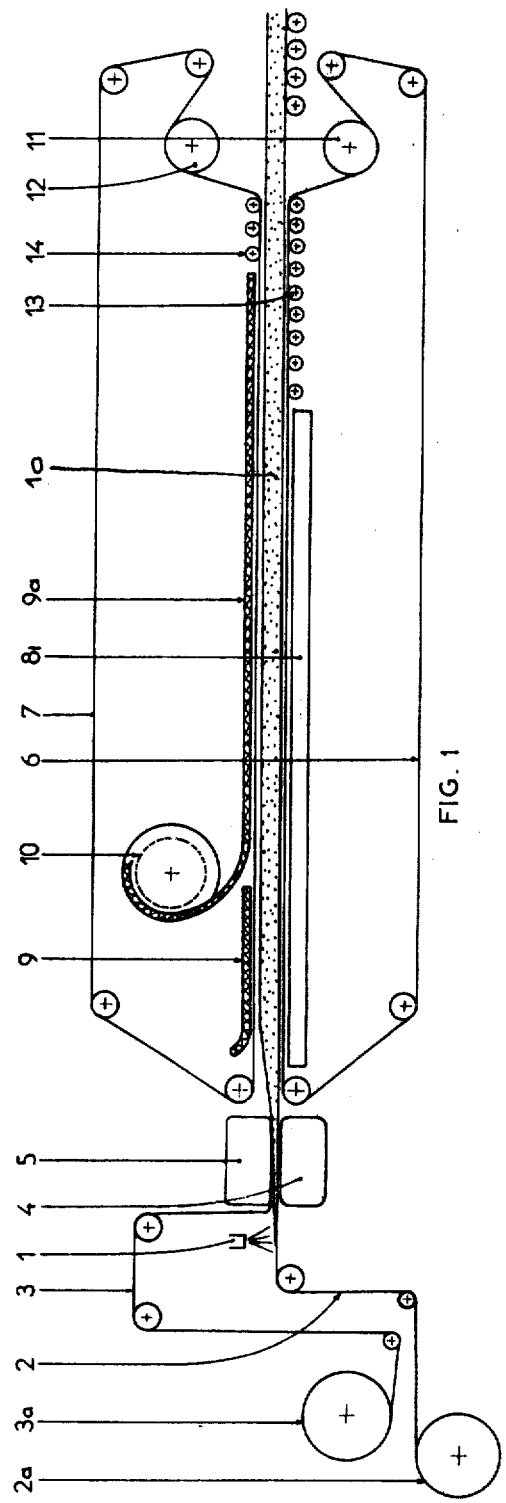
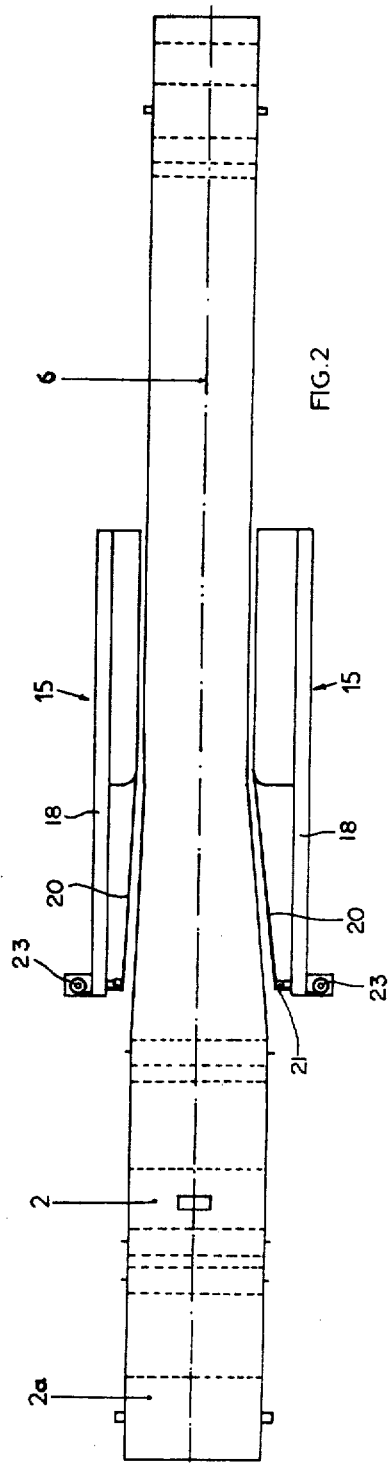

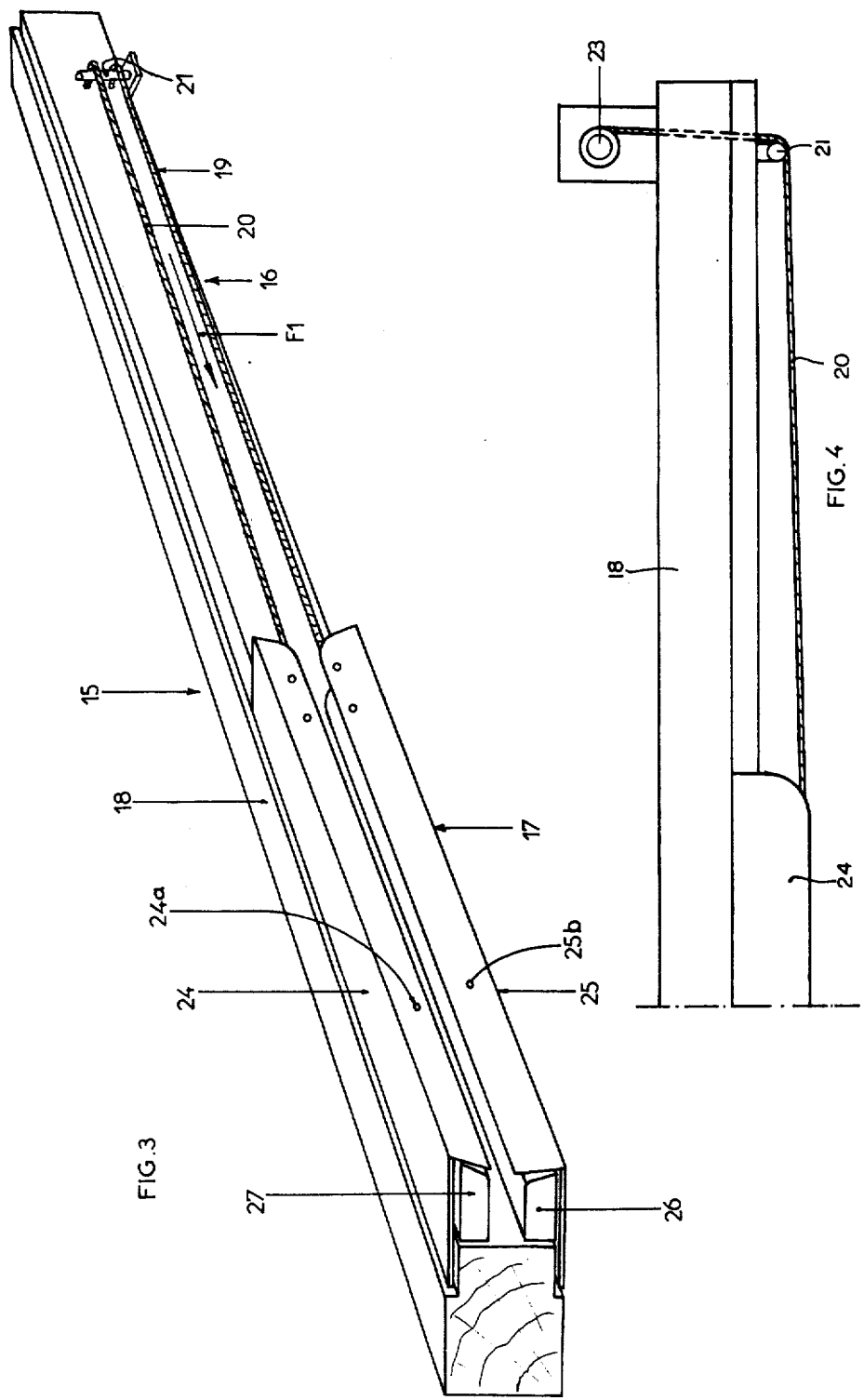

SYSTEM FOR THE CONTINUOUS MANUFACTURE OF PANELS OF SYNTHETIC MATERIAL

COPENDING APPLICATION

This application is a continuation in part of my copending application Ser. No. 224,055 filed Feb. 7, 1972 now U.S. Pat. No. 3,841,811 and entitled Equipment for the Continuous Production of Panels of Synthetic Material.

BACKGROUND OF THE INVENTION

1. Description of the Prior Art

The invention relates in general to a system for the continuous manufacture of panels of plastic material from expandable or non epandable resin, covered with at least one facing.

In my copending patent application Ser. No. 224,055, there is disclosed a system for the continuous manufacture of panels of synthetic material, obtained continuously by uniformly distributing on a support sheet made to move in translatory motion, an expandable or non expandable product in a liquid state, which is then covered with a sheet which is unrolled simultaneously and at the same rate as the support sheet. The complex thus made penetrates into a first shaping device in order to shape the liquid mass. The complex penetrates into a second shaping device consisting of two endless transport belts, the distance between which is defined in particular by the state of the synthetic material. The complex finally penetrates into a third shaping device consisting of rigid plates the distance between which is pre-defined by the thickness of the panels or blocks to be obtained.

According to a characteristic feature of the system disclosed in my aforesaid copending application Ser. No. 224,055, the transport belts which maintain the sheets forming the facings on the synthetic material intended to constitute the core of the panel, extend to the immediate vicinity of the exit point of the first shaping device, and a screen, which is flexible and deformable in all directions, is applied to the external face of the transport belt, which bears on the upper facing in order to prevent the formation of folds.

According to another characteristic feature of the system disclosed in my aforesaid copending aplication Ser. No. 224,055 the mat, which is deformable in all directions, extends from the input point of the transport belts up to the level of a pair of rigid shaping plates, which fulfill their function on each of the internal faces of the transport belts which maintain the facings of the complex on the synthetic material which constitutes the core of the complex.

According to another basic characteristic feature of the system disclosed in my aforesaid copending application Ser. No. 224,055, the part before the mat, which is deformable in all directions, is applied on the internal face of the transport belt, which maintains the upper facing of the complex in an area where the synthetic material is in a liquid state.

Experience has shown that the shaping plates, adjusted so that the distance separating them is fixed, on which the transport belts slide, have the disadvantage of exerting a high pressure on the synthetic material which results in a modification of the structure and orientation of the lattices or cells constituting the synthetic material. This disturbance results in the degradation of the mechanical, chemical and physical properties. In addition, this disturbance varies, the pressure exerted not being constant and varying according to the way several factors are modifies, particularly the speed at which the transport belts move, the temperatures of the plates or the transport belts and the composition of the chemical reactants of the material intended to constitute the core of the complex.

A system according to that described above can be equipped in the manner known with additional shaping devices, acting upon the lateral edges of the complex to maintain applied the part of the facings which cover said lateral sides of the panel. These devices are constituted by guides or fixed rails previously adjusted to a separating distance defined with respect to the movement of the materials of the complex through the system. These fixed guides are made of metal or wood and are located in the space which separates the endless transport belts, these fixed lateral guides having disadvantages similar to those caused by fixed shaping plates. Thus the lateral pressure exerted by the synthetic material intended to constitute the core of the panel can at any moment become too large and result in the modification of the structure and the orientation of the lattices or cells constituting the synthetic material of the core of the complex and, more particularly, in the vicinity of the edges of said complex. This disturbance results in a degradation of the mechanical, chemical, and physical properties of the end product obtained. In case of accidental disturbance of the operation of the system, caused for example by said synthetic material overflowing on the exterior of the sheet constituting the facings of the panel, a blockage can occur, and the system can stop operating.

SUMMARY OF THE INVENTION

The object of the present invention is in particular to overcome these disadvantages by providing an improved system in which the upper plates and the rigid shaping guides are eliminated and replaced by flexible shaping devices, the pressure of which can be adjusted as required, which can yield to the local action of accidental pressure while under normal operating conditions, the appropriate adjustment of the pressure exerted by the shaping elements eliminates the degradation of the properties of the synthetic material which occurs with rigid shaping devices.

The present invention relates to this end to a system according to the principal patent, characterized in that the pressure mat, which is flexible and deformable in all directions, and which is applied to a limited area of the upstream upper part of the driving part of the continuous transport belt, which is applied on the covering facing of the synthetic material, is extended in the downstream direction, in a way such as to exert its action over the whole of the length of the active shaping area.

According to a characteristic feature of the invention, the lateral guides, which maintain the facings on the synthetic material in the vicinity of the lateral edges of the complex, are flexible elements whose flexibility is adjustable.

BRIEF DESCRIPTION OF THE DRAWINGS

A system according to the invention is illustrated on the accompanying drawings in which:

FIG. 1 is a schematic view showing a longitudinal cross-section of the system;

FIG. 2 is a plan view of the system, in which the upper transport belt has been omitted in order to show the location of the flexible lateral guides which are applied on the part of the facings which cover the lateral sides of the complex.

FIG. 3 is a perspective view showing on a very enlarged scale the detail of a mode of construction of a lateral guide.

FIG. 4 is a partial plan view showing the end of the lateral guide in FIG. 3.

GENERAL DESCRIPTION OF PREFERRED EMBODIMENT

According to the invention, as is illustrated in FIGS. 1 and 2, the system for the continuous manufacture of complexes of synthetic material, for example panels or blocks, comprises from beginning to end one or a plurality of fixed or movable casting heads 1, for the distribution of the synthetic material that is to constitute the core of the panel. The synthetic material for example can be a reactive liquid based on expanded polyurethane. The mixture to be expanded is distributed over a sheet 2 being supplied from a supply reel 2a, this sheet being design to constitute the lower facing of the complex. The sheet 2 is displaced in a translatory movement in a continuous manner on a plane support 8₁ which has the form of a rigid plate. A second sheet 3, supplied from a reel 3a, is applied onto the synthetic material in a liquid state to constitute the upper facing of the complex. The facings 2 and 3 form a sheath intended to contain the mixture during its expansion. The facings 2 and 3 pass between the surfaces 4 and 5 of a first distributor-shaper intended essentially to spread and distribute uniformly the synthetic material in its liquid phase.

According to a characteristic feature of the invention, the driving side of the continuous transport belt, which is applied on the upper facing 3 of the complex, and which is maintained applied to the latter by the action of a mat 9, which is flexible and deformable in all directions, is provided with an extension 9a, which exerts its action along the whole of the length of the active shaping area comprised between the beginning and end extremities of the continuous transport belt 7 which cooperates with the support plate 8₁. This mode of construction enables the rigid upper plate described in the system disclosed in my aforesaid copending application Ser. No. 224,055 to be omitted.

In the example of embodiment illustrated in FIG. 1, the extension 9a of the mat 9 is constituted by a distinct section which can be unrolled onto the transport belt 7 from a roll 10. The mat 9 and its extension 9a can be constituted by a continuous section without departing from the scope of the invention. The mat or mats are constituted by a metal mesh framework, said mats being able with advantage to have sections of different weights in accordance with the size of the meshes and the diameter of the wires of which they are made. Variable pressures are thus obtained in the various sections of the mat or mats, which provides an infinite range of pressure adjustment possibilities in accordance with the characteristics of the chemical components of the product intended to constitute the core of the complex, as well as in accordance with other parameters, such as the speed at which the facings which enrobe said synthetic product move through the system.

The flexibility of the mat can or cannot be identical in all directions, to enable the pressures to be exerted on the upper facing of the plates or blocks to be adjusted, in a manner such as to obtain the desired shape, without any degradation of the mechanical, chemical and physical properties of the products that are to be obtained.

To the same end, it is possible to combine, either in the direction of the length or in the direction of the width, elements of metal screens which can have different flexibilities and different weights.

The transport belts 6 and 7 are driven by two traction drums 11 and 12. Two series of rolls separated by a fixed distance 13, 14, but which can be adjusted, are located with advantage at the input end of the system in order, if necessary, to move the complex along, particularly in the case where the pressure exerted by the mats 9 and 9a were to be insufficient.

By referring to FIG. 2, it will be noted that the system is completed by lateral shapers 15, in order to guide and fold the lateral edge portions of the facings 2 and 3 against the side face of the complex. This causes the complex to become narrower as shown in FIG. 2. The guides 15 include elements which are flexible, their flexibility being adjustable as required. Details of one mode of construction of one of these guides is fully described in FIGS. 3 and 4.

It is surprising to find that the omission of the upper plates and the rigid shaping guides, and their replacement by one or a plurality of flexible and deformable mats, enables plates or blocks with the desired shape to be obtained.

In FIG. 3, the arrow $F_1$ shows the direction in which the elements constituting the complex move in relation to the guide 15. This guide is constituted by two distinct parts 16 and 17, which can be used either independently, or consecutively, as in the example illustrated. The two parts 16 and 17 of the guide 15 are fixed to a rail support 18, made of wood, for example. The height of this rail corresponds substantially to the thickness of the finished complex, less a space enabling each guide to be inserted between the driving sides opposite the transport belts 6 and 7. The part 16 is constituted essentially by two cables, made, for example, of steel, 19 and 20, fixed to the upstream end of the guide 15. The cables 19 and 20 extend around stud 21 and are separated from one another to define, between the cables, a space for the passage of the facings of the complex. The other end of the cables 19 and 20 is joined to the upstream ends of the flanges constituted by the profiled sections of the second section 17 of the guide 15. The end of the cable 19, adjacent to the studs 21, 22, is connected to a stretcher 23 which enables the tension of the cables 19 and 20 to be adjusted as required.

The section 17 of the guide 15 is constituted by two profiled sections 24, 25, which are in the form of plates, made of steel for example, folded in a manner such as to have a flexible application face 24a, 25b, which comes into contact with the parts of the facings which borders the lateral sides of the complex. The plates 24, 25, are fixed to the support 18 in a manner such as to make a free space between the application faces 24a and 25b and the support 18. Inside this space, an element is placed which is elastically deformable by the pressure which is exerted on the bearing faces 24a, 25b of the plates 24 and 25. Each elastically deformable element 26, 27 is constituted preferably by an inflatable membrane. These elements, which are elastically deformable can also be constituted by an elastomeric material, in the form of strips. In the case where the elastically deformable elements are constituted by an inflatable membrane, it is possible to obtain variable pressures, which can be adjusted as required, on the contact edges 24a and 25b of the plates 24 and 25, by adjusting the pressure of the air or gas introduced into its chamber.

The lateral shaping device enables the shape of the lateral edges of the plates or blocks to be controlled, and thus obtain plates or blocks not requiring any subsequent machining before use, which also results in a saving of material.

Of course, the invention is not limited to the examples of the embodiment herein above described and illustrated. If necessary, other methods and other forms of embodiment can be used without departing from the scope of the invention.

What I claim is:

1. Apparatus for the continuous manufacture of panels having a core of expansible synthetic material covered on opposite faces by continuous sheets comprising means for supporting first and second rolls of facing sheets adapted to be unwound and for defining the faces of a laminated panel, means for delivering expansible synthetic material between the sheets and to constitute the core of the panel, a first former for spreading and uniformly distributing the expansible material while it is between the facing sheets, a second former downstream from said first former, said second former including upper and lower endless conveyor belts each adapted to contact one of the facing sheets, said conveyor belts being disposed one above the other for translation of the panel and expansible material, said belts extending in a downstream direction from a location adjacent said first former, at least one flexible mesh mat overlying the lower run of the upper belt, said mat being constrained at its upstream end and being deformable in all directions, said mat having a length so as to cover a major portion of the lower run of the upper belt, and a third former adjacent said second former, said third former including an adjustable guide adjacent marginal edges of the panel, the distance between said guides being less than the width of the facing sheets for folding at least one marginal edge portion of at least one facing sheet so that it is juxtaposed to a side face of said expansible material.

2. Apparatus in accordance with claim 1 wherein said guides include flexible elements for adjusting at least one of said guides with respect to a side face of expansible material between the facing sheets.

3. Apparatus in accordance with claim 1 wherein each guide includes two cords for contact with marginal edge portions of a facing sheet, said cords being supported so as to be substantially parallel to the direction of movement of the panel, means for adjusting the tension of said cords, each guide including at least one flexible face adapted to be flexed into contact with a side face of the expansible material.

4. Apparatus in accordance with claim 3 wherein said cords extend at a slight angle with respect to the side edges of the facing sheets, said cords being upstream from said flexible face.

5. Apparatus in accordance with claim 1 wherein at least one of said guides includes an inflatable membrane.

* * * * *